United States Patent [19]

Amano

[11] Patent Number: 5,612,757
[45] Date of Patent: Mar. 18, 1997

[54] CAMERA ADAPTED TO USE FILM HAVING MAGNETIC RECORDING PART

[75] Inventor: Kenichiro Amano, Kanagawa-ken, Japan

[73] Assignee: Canon Kabushiki Kaisha, Tokyo, Japan

[21] Appl. No.: 461,682

[22] Filed: Jun. 5, 1995

[30]     Foreign Application Priority Data

Jun. 15, 1994   [JP]   Japan .................................. 6-155526

[51] Int. Cl.$^6$ ..................................................... G03B 17/24
[52] U.S. Cl. ............................................ 396/319; 396/389
[58] Field of Search ................................... 354/105, 106, 354/207

[56]             References Cited

U.S. PATENT DOCUMENTS

| | | | |
|---|---|---|---|
| 4,878,075 | 10/1989 | Cannon | 354/173.1 |
| 5,130,728 | 7/1992 | Goto et al. | 354/105 |
| 5,220,367 | 6/1993 | Matsuyama | 354/105 |
| 5,251,077 | 10/1993 | Saitoh | 360/53 |
| 5,281,987 | 1/1994 | Nagata | 354/105 |
| 5,432,570 | 7/1995 | Ueda et al. | 354/105 |
| 5,477,289 | 12/1995 | Smart | 354/106 |

FOREIGN PATENT DOCUMENTS 0402855   12/1990   European Pat. Off. .

OTHER PUBLICATIONS

Patent Abstracts of Japan No. JP4068329, vol. 16, No. 268 (P–1372), published Mar. 4, 1992.
Patent Abstracts of Japan No. JP4246628, vol. 17, No. 20 (P01469), published Sep. 2, 1992.

*Primary Examiner*—Safet Metjahic
*Assistant Examiner*—Eddie C. Lee
*Attorney, Agent, or Firm*—Robin, Blecker, Daley & Driscoll

[57]             ABSTRACT

A camera of the kind making a discrimination between exposed and unexposed states of each of frames of a film by detecting information recorded in a magnetic recording part provided at each of the frames is arranged to detect the information twice for one and the same frame by causing the film to be transported in different directions and to finally decide the state of exposure of the frame according to whether the results of the detection made twice coincide with each other or not, so that the discrimination can be accurately carried out.

14 Claims, 17 Drawing Sheets

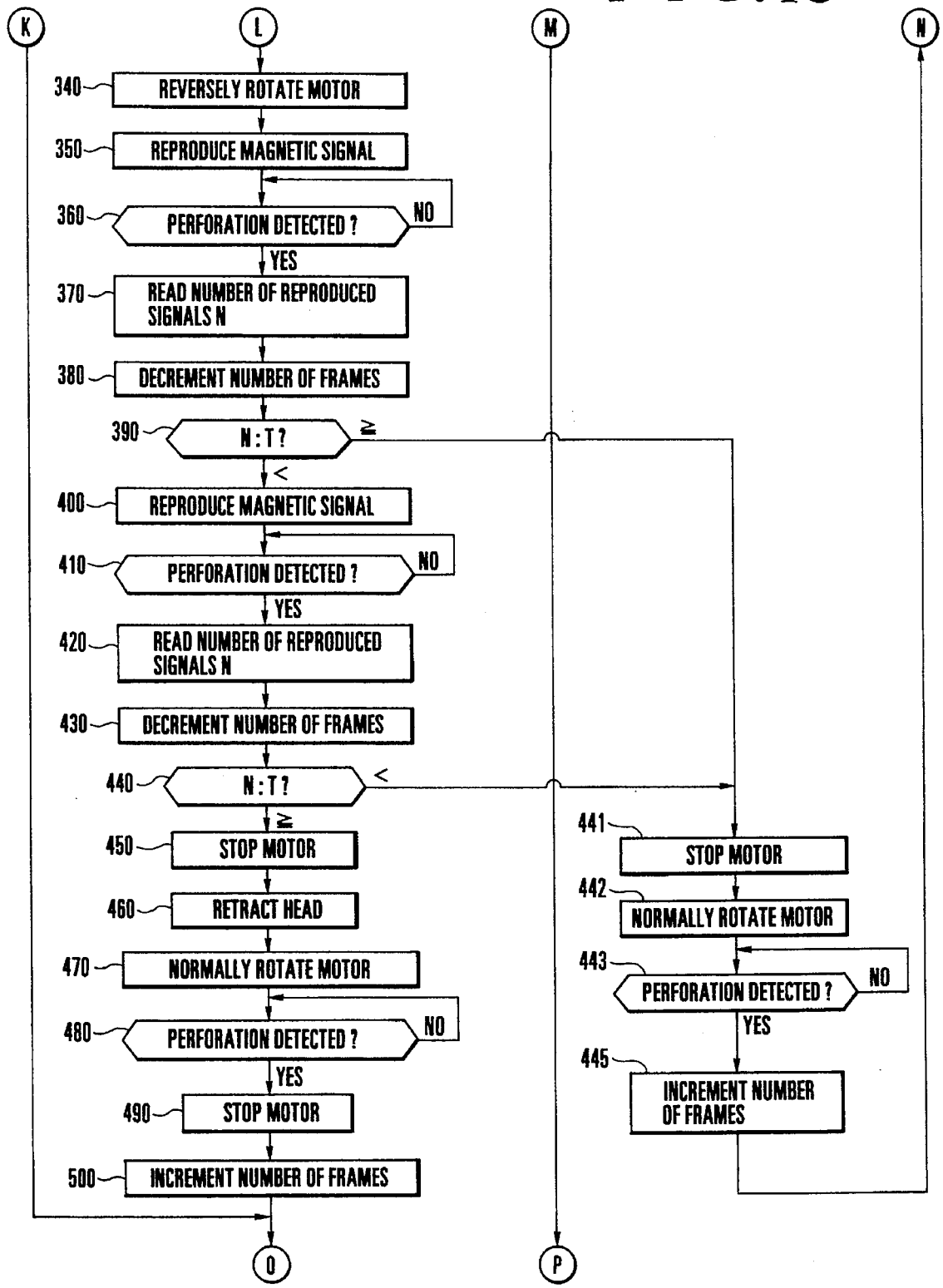
F I G. 10

F I G.16(a)
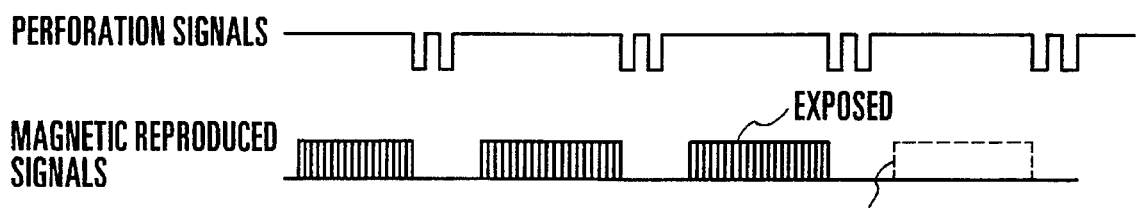
F I G.16(b)
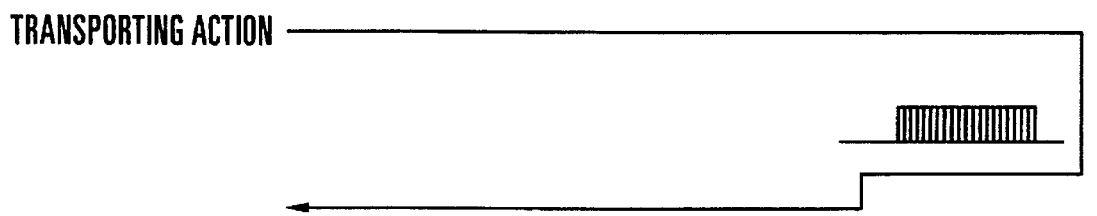
F I G.16(c)
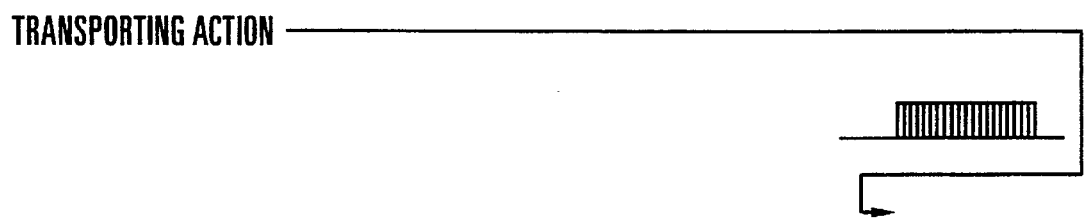
F I G.16(d)
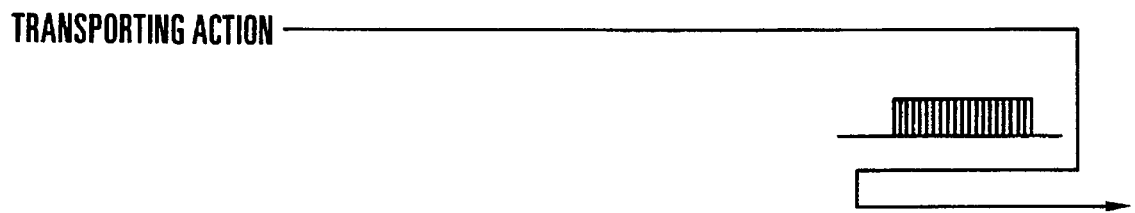
F I G.16(e)
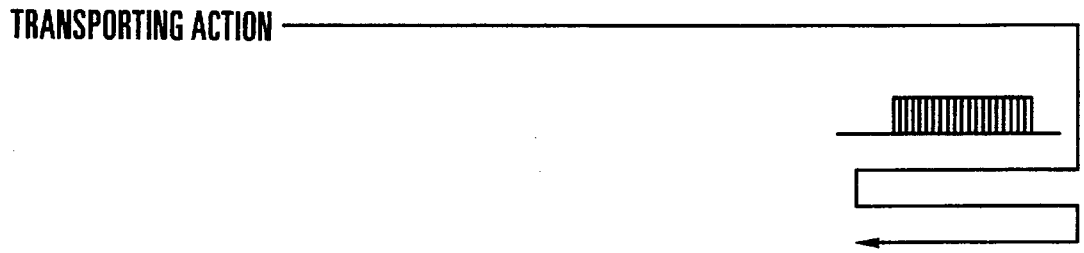

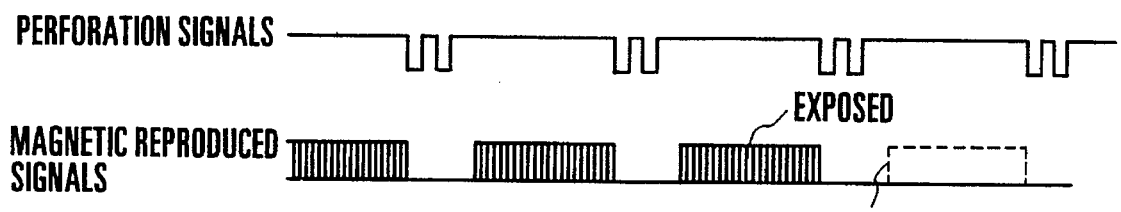
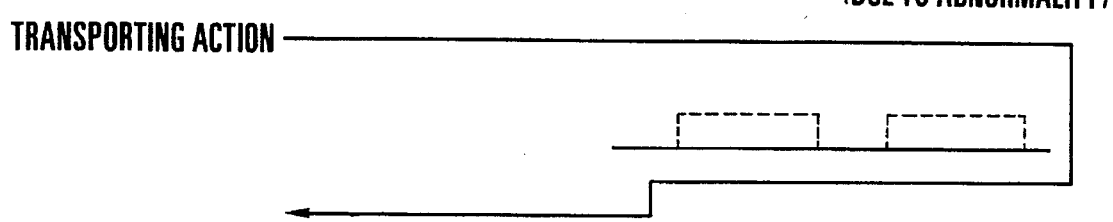
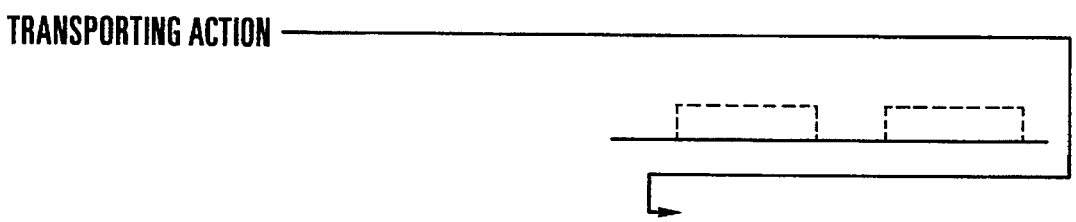
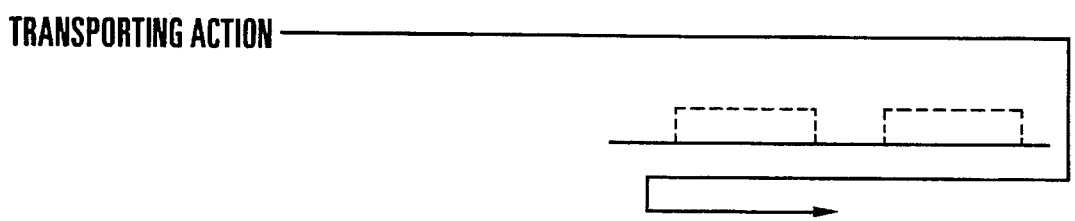
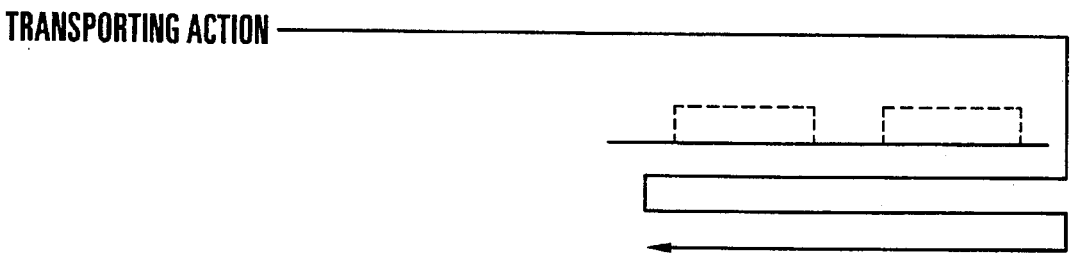

CAMERA ADAPTED TO USE FILM HAVING MAGNETIC RECORDING PART

BACKGROUND OF THE INVENTION

1. Field of the Invention

This invention relates to an improvement on a camera having a magnetic head arranged to record and reproduce, as magnetic signals, information of varied kinds in and from magnetic recording parts of a film.

2. Description of the Related Art

A camera of the kind arranged in such a manner that, when the camera is loaded again with a film cartridge which has been taken out before all available frames of it are exposed with a magnetic signal recorded at each exposed frame by a magnetic head, a discrimination is made for each frame between exposed and unexposed states according to the presence or absence of the magnetic signal and then the leading part of each unexposed frame thus found is located, has been disclosed in Japanese Laid-Open Patent Application No. HEI 4-68329. Another camera which has been disclosed in Japanese Laid-Open Patent Application No. HEI 5-158165 is arranged to retract a magnetic head from a film surface when magnetic signal reproduction is not necessary. Further, a camera which is arranged to reproduce, in rewinding the film, a magnetic signal for the purpose of checking data recorded at the time of film winding has been disclosed in Japanese Patent Application No. HEI 5-183236.

However, the first example of the prior art mentioned above is arranged to make a discrimination between exposed and unexposed states only in winding the film. Therefore, once it becomes impossible to obtain a reproduced signal for a frame due to some accident, all frames thereafter might be decided to be unexposed.

In the case of the second example of the prior art, the magnetic head is arranged to be retracted from the film surface only for a film which has not yet been used.

In the third example of the prior art, no heed is given to the necessity of a checking action on a film taken out before all its available frames are used.

SUMMARY OF THE INVENTION

It is one aspect of the invention under the present application to provide a camera which is capable of preventing a double exposure in the event of a failure, such as a fault of a magnetic head and a magnetic head driving circuit, or the like.

It is another aspect of the invention to provide a camera which is capable of enabling the user to readily know an accident such as the failure mentioned above.

It is a further aspect of the invention to provide a camera which is capable of continuing a shooting operation on an unexposed frame even in the event of an accident such as a momentary failure of a magnetic head to remain in contact with a film surface.

It is a further aspect of the invention to provide a camera arranged to be capable of making a correct decision by preventing any incorrect decision from being made in the neighborhood of a reference level set for a discrimination between exposed and unexposed states and thus to permit a shooting operation to be continued on unexposed frames of a film.

It is a still further aspect of the invention to provide a camera which is arranged to discriminate between an exposed state and an unexposed state of one and the same frame of a film, according to the presence or absence of a magnetic signal recorded by a magnetic head, when the film is transported both in the directions of winding and rewinding the film, and to finally decide the exposed state or unexposed state of the frame according to coincidence or discrepancy between results of the twice-made discrimination.

These and other aspects and features of the invention will become apparent from the following detailed description of embodiments thereof taken in conjunction with the accompanying drawings.

BRIEF DESCRIPTION OF THE DRAWINGS

FIG. 10 is a flow chart showing the operation continuing from what is shown in FIG. 9.

FIGS. 16(a) to 16(e) show in a time chart an operation of each of the embodiments of the invention performed in using again a film cartridge taken out before use of all the frames of the film when the film is in an abnormal state.

FIGS. 17(a) to 17(e) show in a time chart another operation of each of the embodiments of the invention performed in using again a film cartridge taken out before use of all the frames of the film when the film is in an abnormal state.

DETAILED DESCRIPTION OF THE PREFERRED EMBODIMENTS

Figure 1:
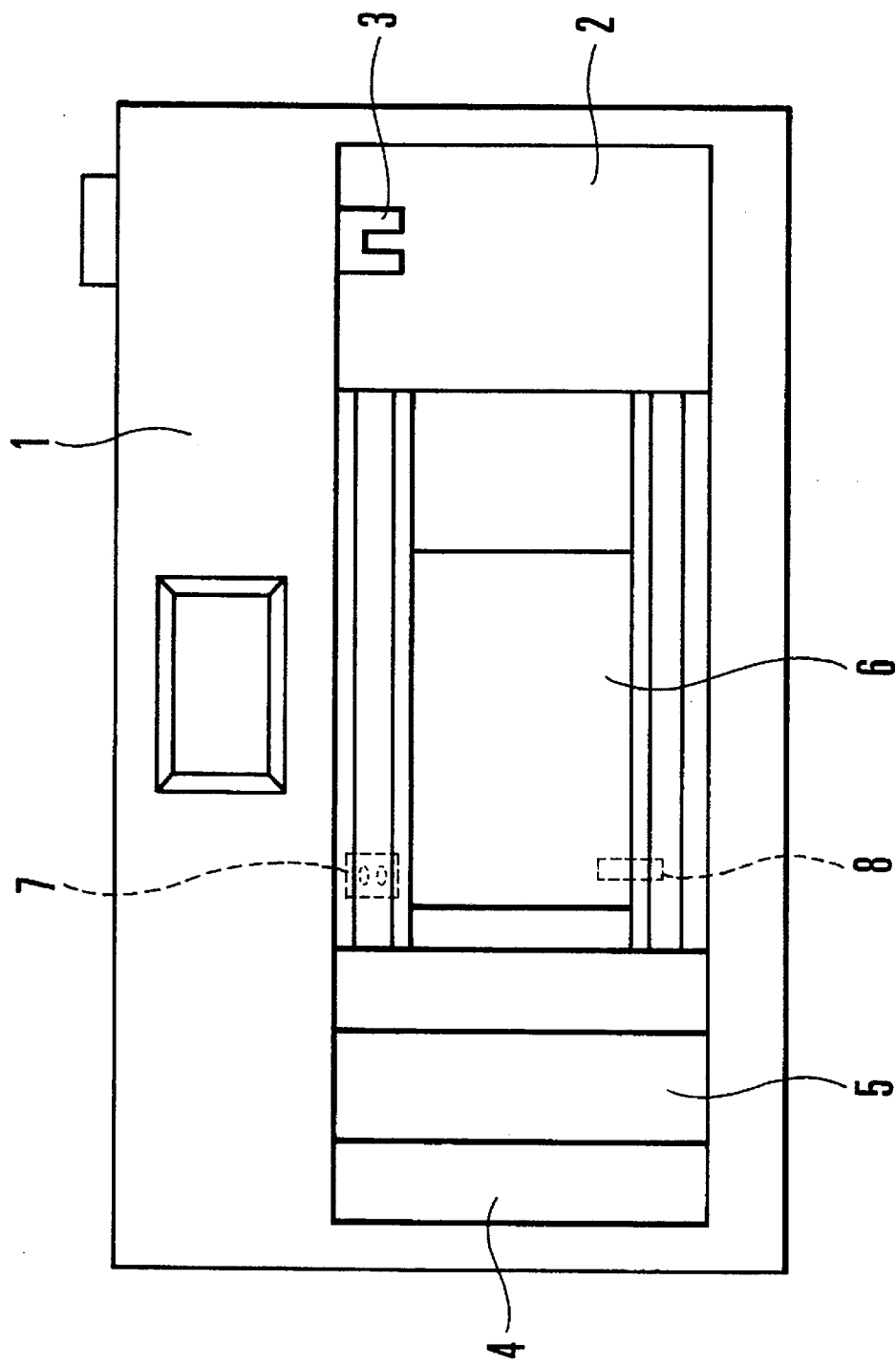
FIG. 1 is a rear view showing a camera which is a first embodiment of the invention in a state of having its back cover removed.

The following describes the invention in detail through some embodiments thereof shown in the drawings.

FIG. 1 is a rear view showing a camera which is a first embodiment of the invention in a state having its back cover removed. Referring to FIG. 1, the illustration includes a camera body 1, a cartridge chamber 2, a fork 3, a spool chamber 4 and a film take-up spool 5. An aperture 6 is provided for exposing a film to light. A photoreflector 7 is disposed in an upper left part, as viewed from the rear of the camera, between a current shooting frame and a next frame and is arranged to detect perforations provided in the film. A magnetic head 8 is arranged to be pressed into contact with a magnetic recording part (a magnetic layer) of the film and to record or reproduce information into or from the magnetic recording part.

Figure 2:
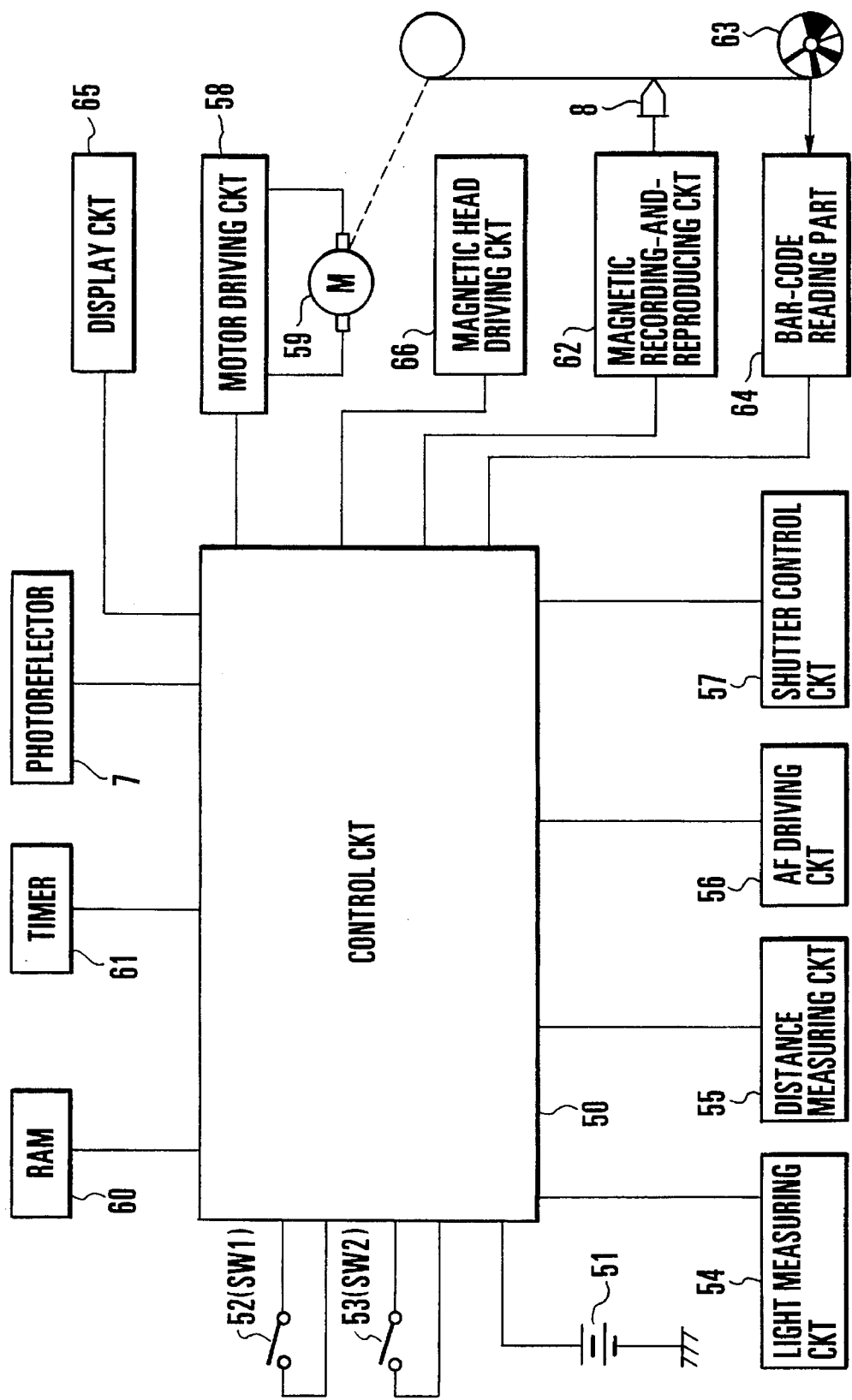
FIG. 2 is a block diagram showing the circuit arrangement of the camera of the first embodiment.

FIG. 2 is a block diagram showing the circuit arrangement of the above-stated camera. Referring to FIG. 2, a control circuit 50 is arranged to control the circuits of varied kinds of the camera. A battery 51 is arranged to serve as a power source. A switch (SW1) 52 is arranged to be turned on by a first stroke of a release button. A switch (SW2) 53 is arranged to be turned on by a second stroke of the release button. A light measuring circuit 54 is arranged to measure the luminance of an object of shooting. A distance measuring circuit 55 is arranged to measure a distance to the object. An AF driving circuit 56 is arranged to adjust the focal point of a photo-taking lens (not shown) on the basis of information on a measured distance obtained by the distance measuring circuit 55. A shutter control circuit 57 is arranged to control the opening and closing actions on a shutter. A motor driving circuit 58 is arranged to drive a film transport motor 59. A reference numeral 60 denotes a RAM and a numeral 61 a timer. A magnetic recording-and-reproducing circuit 62 is arranged to record and reproduce information on and from the film. A bar-code reading part 64 is arranged to read information about the number of frames and a film using state recorded in bar codes on a bar-code disk 63 on the film cartridge. A display circuit 65 is arranged to display a shutter time (Tv) and an aperture value (Av) and also to make a warning display or the like against an error made by the magnetic recording-and-reproducing circuit 62. A magnetic head driving circuit 66 is arranged to cause a magnetic head 8 to come into contact with a film surface and to move away from the film surface.

Figure 3:
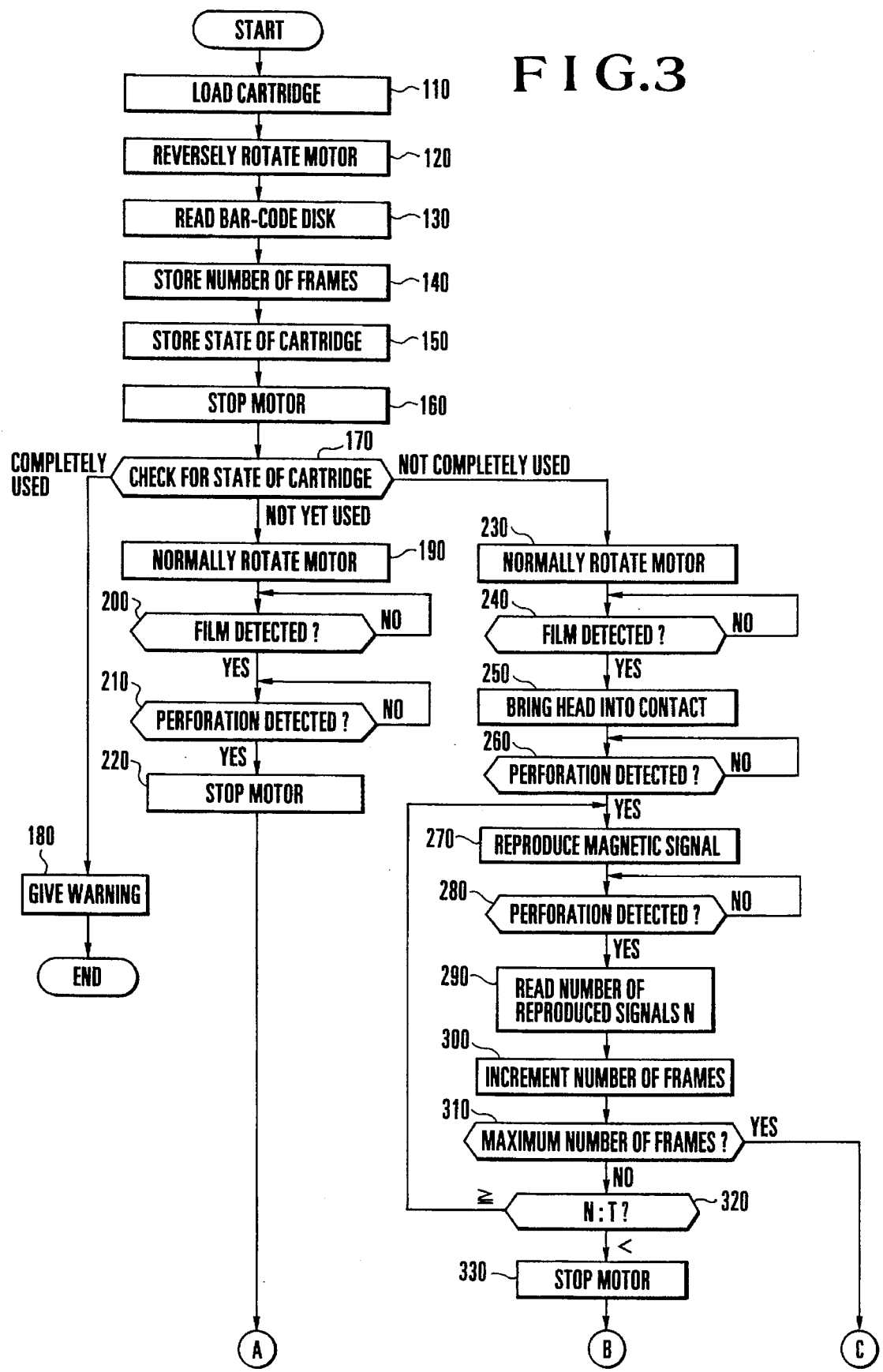
FIG. 3 is a flow chart showing a part of an operation of the camera of the first embodiment.

FIG. 3 is a flow chart showing an operation of the above-stated circuit arrangement to be performed with the control circuit 50 assumed to be composed of a microprocessor. Referring to FIG. 3, when the camera is loaded with a film cartridge at a step 110, the flow of operation comes to a step 120. At the step 120, the film transport motor 59 is driven to rotate in the direction of rewinding the film in such a way as to cause a spool disposed within the film cartridge to rotate. At a step 130, the information about the number of photographable (usable) frames and the used state of the film cartridge recorded on the bar-code disk 63 of the film cartridge is read out. At steps 140 and 150, the information about the number of photographable frames and the state of use of the cartridge (an unused state, a state of having been used only in part or a completely used state) is stored. At a step 160, the driving action of the film transport motor 59 is brought to a stop.

At a step 170, a check is made for the state of use of the currently loaded film cartridge on the basis of the information about the state of use of the film cartridge stored by the step 150. If the film cartridge is found to have completely been used, the flow of operation comes from the step 170 to a step 180 to cause the display circuit 65 to make a warning display and the flow comes to an end without performing any film winding action.

Figure 5:
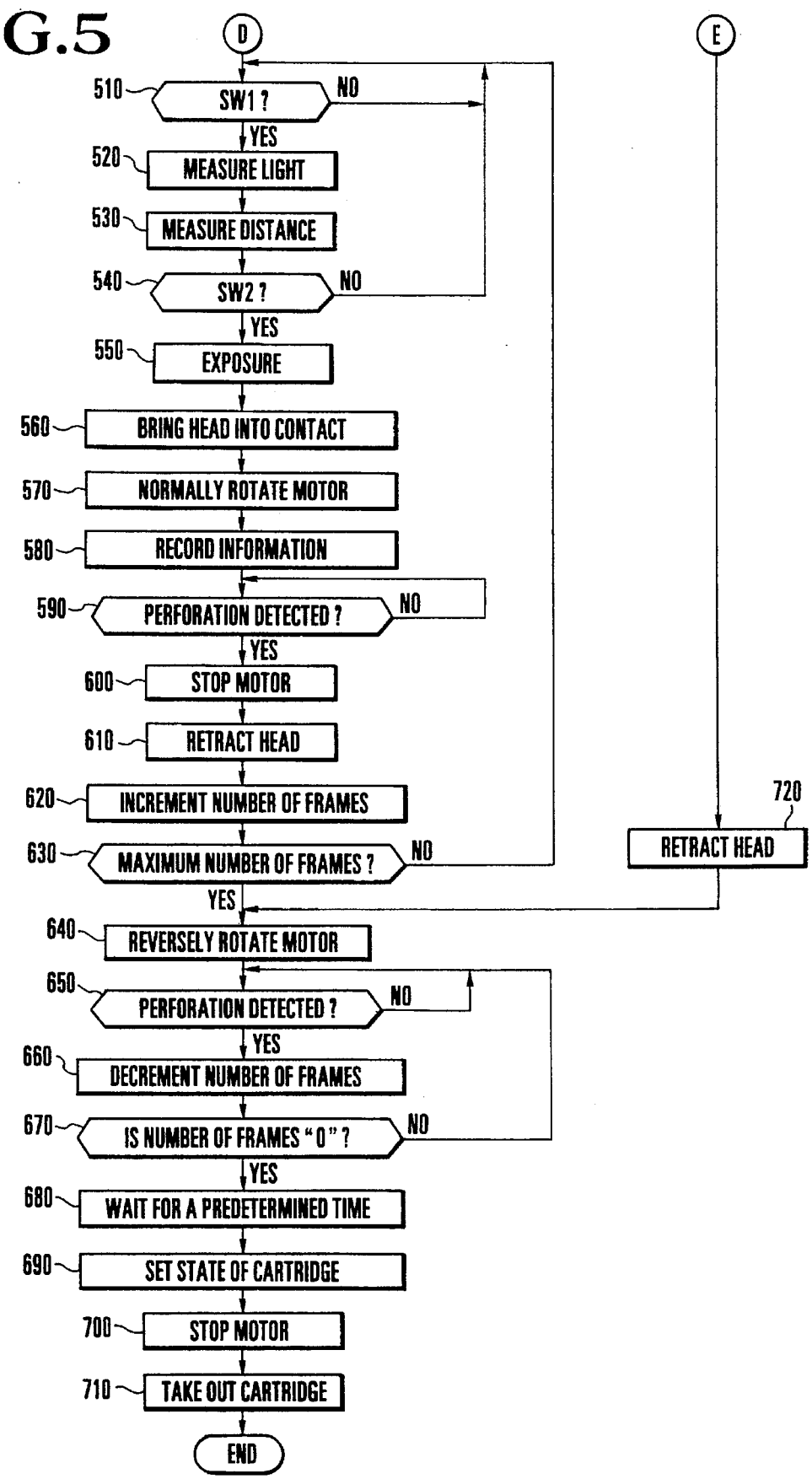
FIG. 5 is a flow chart showing the operation continuing from what is shown in FIG. 4.

Further, if the film cartridge is found to be unused at the step 170, the flow proceeds from the step 170 to a step 190. At the step 190, the film transport motor 59 is caused to normally rotate and a film winding action begins. At a next step 200, the output of the photoreflector 7 is checked to find if the fore end part of the film sent out from the inside of the film cartridge has passed a part where the photoreflector 7 is located. If so, the flow comes to a step 210. At the step 210, the photoreflector 7 is again checked to find if a perforation of the film has been detected. If so, the flow comes to a step 220 to stop the driving action of the film transport motor 59. The flow then proceeds to steps beginning with a step 510 as shown in FIG. 5.

If the film cartridge is found at the step 170 to be in a state of not completely used (used only in part), the flow comes from the step 170 to a step 230. At the step 230, film winding is allowed to begin by causing the film transport motor 59 to rotate in the normal direction. At a step 240, the output of the photoreflector 7 is checked to find if the fore end part of the film has passed the position of the photoreflector 7. If so, the flow comes to a step 250 to cause the magnetic head driving circuit 66 to bring the magnetic head 8 into contact with the surface of the film. At a step 260, a check is made to find if a perforation of the film has been detected by the photoreflector 7. If so, the flow proceeds to a step 270. At the step 270, a magnetic signal recorded on the film is reproduced. At a step 280, the number of data pulses, i.e. the number of reproduced signals, is counted until a next perforation is detected. When the next perforation is detected, the flow comes to a step 290 to read the number of reproduced signals. The number of reproduced signals thus read out is assumed to be N. At a step 300, a count number of frames is incremented by one. At a next step 310, a check is made to find if the number of frames has reached the number of photographable frames (a prescribed number of frames). If so, the flow comes to a step 720 which is shown in FIG. 5. At the step 720, the magnetic head 8 is retracted from the film surface. After that, the flow comes to a step 640 which is provided for film rewinding.

Figure 4:
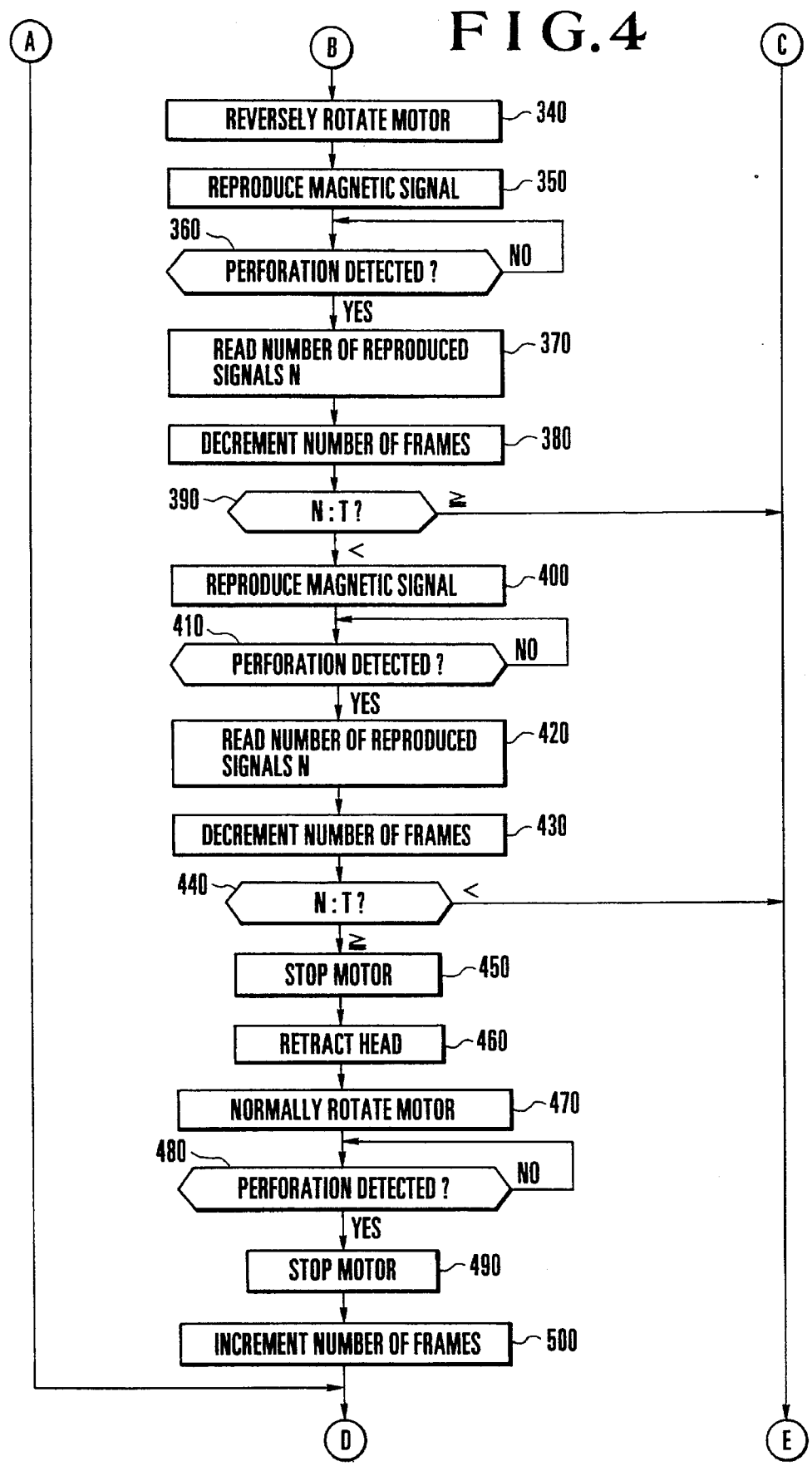
FIG. 4 is a flow chart showing the operation continuing from what is shown in FIG. 3.

At the above-stated step 310, if the number of frames is found to have not reached the photographable number of frames read by the step 140, the flow comes to a step 320. At the step 320, the number N of reproduced signals is checked to find if it is equal to or above a predetermined value T. If so, the frame is judged to be an exposed frame and the flow comes back to the step 270. If not, the frame is judged to be unexposed and the flow comes to a step 330. At the step 330, the film transport motor 59 is caused to stop to end the film winding action, and the flow proceeds to a step 340 which is shown in FIG. 4.

At the step 340, the film transport motor 59 is caused to rotate in the reverse direction to move the film in the direction of rewinding. At a next step 350, magnetic signals are reproduced. At a step 360, the number of reproduced signals is counted until a next perforation is detected. When the next perforation is detected, the flow proceeds to a step 370. At the step 370, the number of signals reproduced is read out and the number is assumed to be N. At a step 380, the number of frames is decremented by one. At a step 390, the number of reproduced signals N is compared with a predetermined value T. If the number N is found to be equal to or larger than the value T, the frame is considered to have been exposed, contrary to what has been decided at the time of film winding. In that event, the flow comes to a step 720 of FIG. 5 to execute steps following the step 720 as will be described in detail later. A film transporting state obtained at that time is as shown in FIG. 16(b). If the number N is found to be smaller than the value T, on the other hand, the frame is considered to be unexposed in the same result as what is decided at the time of film winding, and the flow proceeds to a step 400.

At steps 400 to 430, the number of reproduced signals N for one frame is obtained in the same manner as the above-stated steps 350 to 380. Then, at a step 440, the number of reproduced signals N is compared with the predetermined value T. If they are in a relation "N<T", the frame is considered to be unexposed, contrary to what is decided at the time of film winding, and the flow comes to execute the steps 720 and others shown in FIG. 5. Although details of these steps will be described later, the film transporting state obtained then is as shown in FIG. 17(*b*). If the number N is found to be equal to or larger than the value T, the frame is decided to be already exposed, in the same result as decided at the time of film winding, and the flow proceeds to a next step 450.

At the step 450, the film transport motor 59 is stopped from driving and the driving action in the film rewinding direction is brought to an end. At a step 460, the magnetic head 8 is retracted from the film surface as the magnetic reproduction is not required. At a step 470, the film transport motor 59 is caused to rotate in the normal direction to begin transporting the film in the film winding direction. At a step 480, the flow waits until a perforation is detected by the photoreflector 7. Upon detection of the perforation, the flow proceeds to a step 490. At the step 490, the film transport motor 59 is stopped from driving. The film driving in the film winding direction comes to an end. (In other words, an action of locating or bringing up the leading part of an unexposed frame is finished by the step 490.) At a step 500, the number of frames is incremented by one. The flow then proceeds to a step 510 of FIG. 5.

The step 510 and steps subsequent to it form a shooting (or photographing) sequence of processes. At the step 510, a check is made to find if the switch 52 (SW1) which is provided for commencement of light and distance measuring actions has been pushed. If not, the flow waits until this switch is pushed. After that, the flow comes to a step 520 to cause the light measuring circuit 54 to measure light. Control values for a shutter and a diaphragm are determined according to the result of the light measurement. At a step 530, the distance measuring circuit 55 is caused to perform the distance measuring action. The focal point of the phototaking lens is adjusted by driving the AF driving circuit 56 according to the result of the distance measurement.

At a next step 540, a check is made to find if the switch 53 (SW2) which is provided for commencement of an exposure has been pushed. If not, the flow comes back to the step 510 to repeat the same actions. If so, the flow proceeds to a step 550 to carry out an exposure by causing the shutter control circuit 57 to act. After the film is exposed, the flow comes to a step 560 to bring the magnetic head 8 into contact with the film surface. At a next step 570, the film transport motor 59 is caused to normally rotate for film winding. At a step 580, the magnetic head 8 is caused by the magnetic recording-and-reproducing circuit 62 to record information on the film. At a step 590, the photoreflector 7 is caused to detect a perforation. When the perforation is detected, the flow comes to a step 600 to stop the film transport motor 59 from driving and the film winding action comes to an end. At a step 610, the magnetic head 8 is retracted from the film surface. At a step 620, the number of frames is incremented be one.

At a step 630, a check is made to find if the number of frames counted has exceeded a prescribed number of photographable frames stored by the step 140. If not, the flow comes back to the step 510 to allow shooting to continue. If so, the flow proceeds to a step 640 to have the film transported in the film rewinding direction by causing the film transport motor 59 to reversely rotate. At a step 650, a check is made for detection of a perforation. At a next step 660, the count number of frames is decremented by one every time a perforation is detected by the step 650. The steps 650 and 660 are repeated until the number of frames is found to have reached "0" at a step 670. At the step 670, when the number of frames becomes "0", the flow comes to a step 680. At the step 680, the flow waits for a predetermined period of time set to allow the film to be completely taken into the film cartridge. After that, at a step 690, the signal of the bar-code reading part 64 is detected and set in such a way as to have the display of a cartridge using state show that all the frames have already been exposed. At a step 700, the film rewinding action is brought to an end by bringing the rotation of the film transport motor 59 to a stop.

Further, in a case where a film rewinding button which is not shown happens to be pushed to rewind the film while the film is still in process of use, the film is controlled by the step 690 to be set at the position where the use of the film has been suspended. Further, in a case where a discrepancy detected by the step 390 or 440 between a decision made in film winding and a decision made in film rewinding causes the flow to pass the step 720, i.e., where the film is rewound because of a decision for abnormality, the film cartridge may be set in the state of cartridge as recorded by the step 150. Such arrangement enables a film cartridge which is used only halfway to be loaded on some other camera in place of a camera which has come out of order. At a step 710, the cartridge is taken out and a sequence of processes comes to an end.

The first embodiment is arranged as described above to rewind the film while retracting the magnetic head 8 away from the film surface in the event of a discrepancy between the decisions made respectively when the film is transported in the winding direction and in the rewinding direction. The arrangement effectively prevents an accidental double exposure due to, for example, a fault of the magnetic recording-and-reproducing circuit 8.

Figure 6:
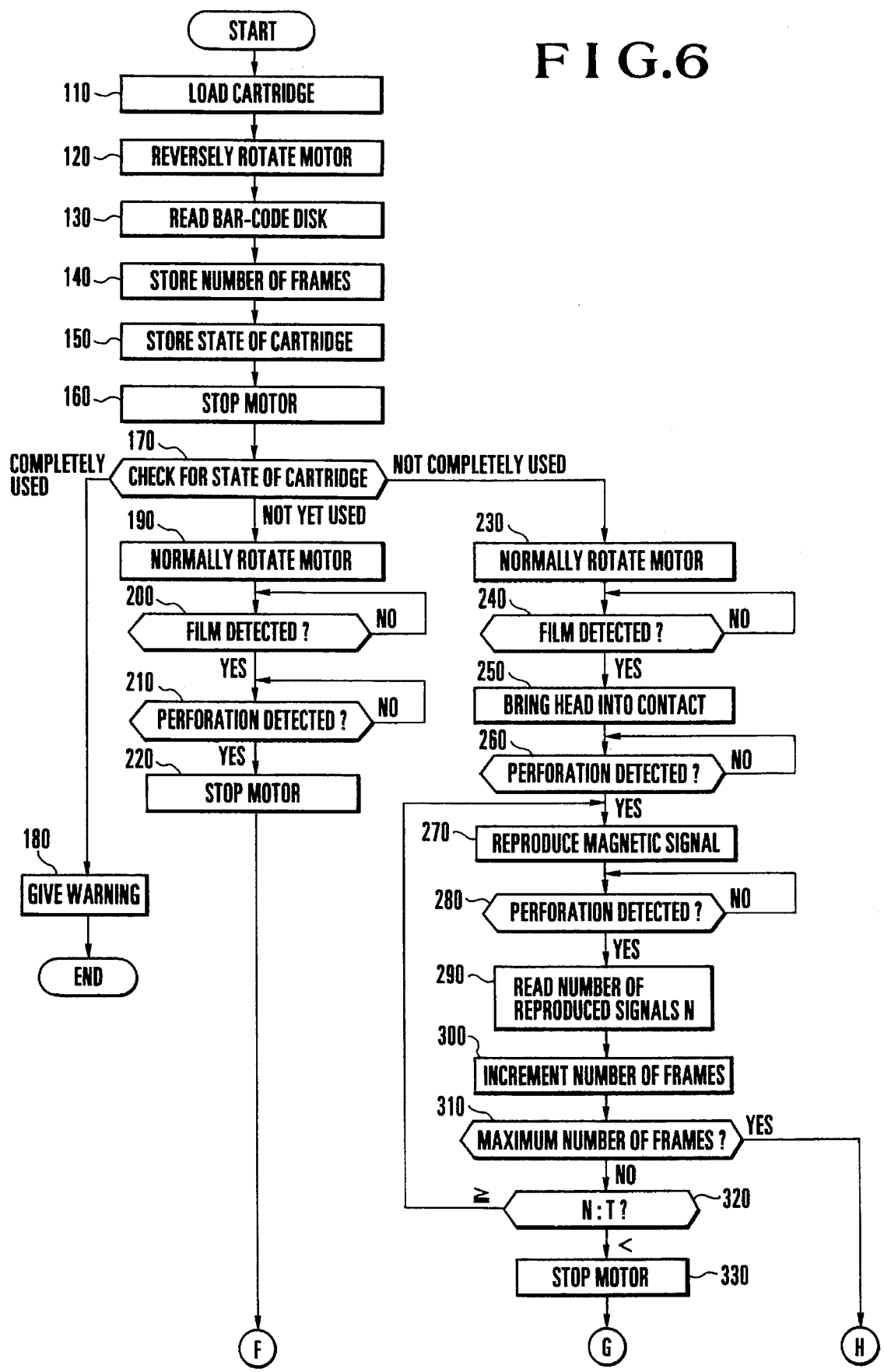
FIG. 6 is a flow chart showing a part of an operation of a camera which is arranged as a second embodiment of the invention.
Figure 7:
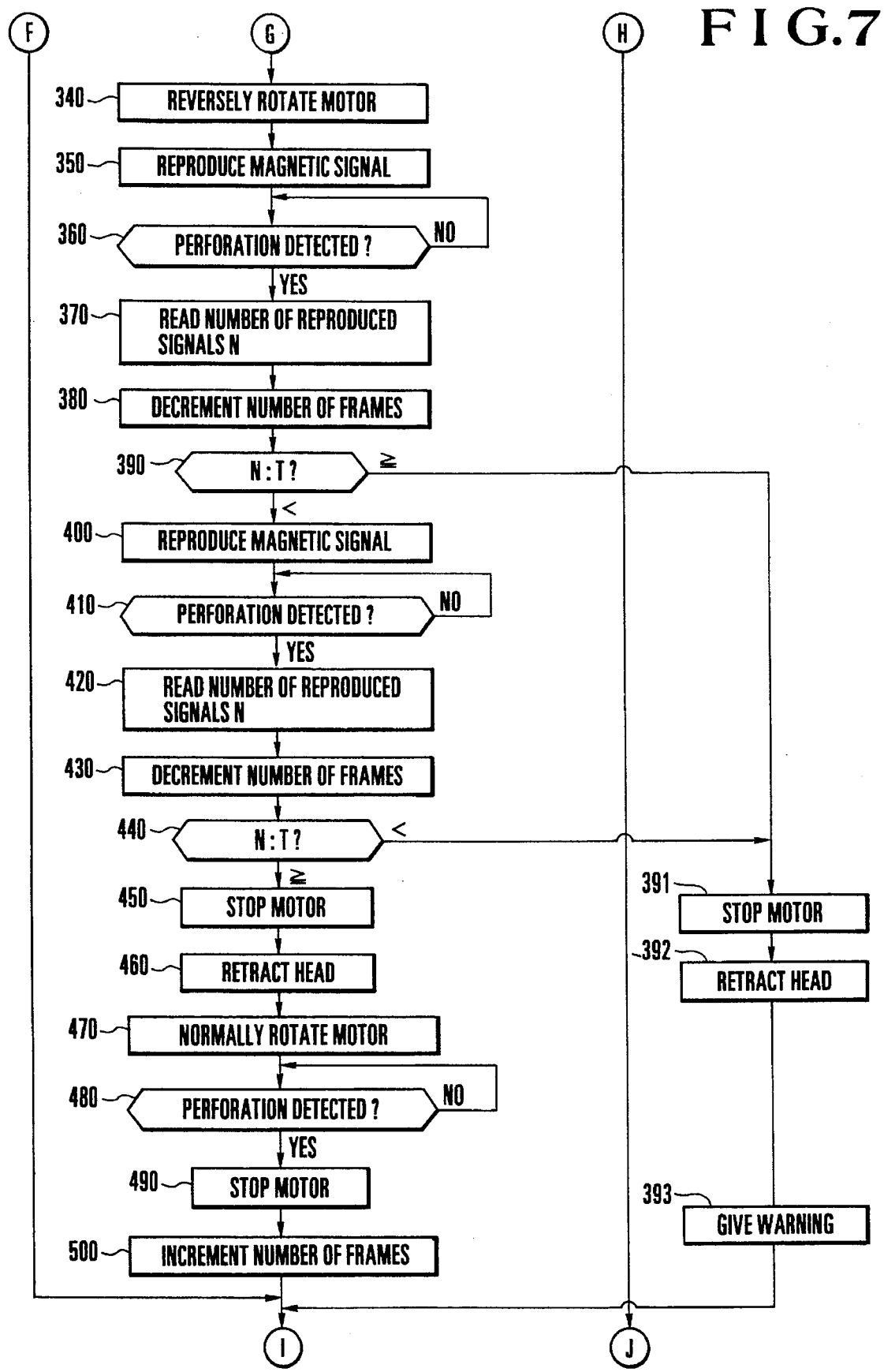
FIG. 7 is a flow chart showing the operation continuing from what is shown in FIG. 6.
Figure 8:
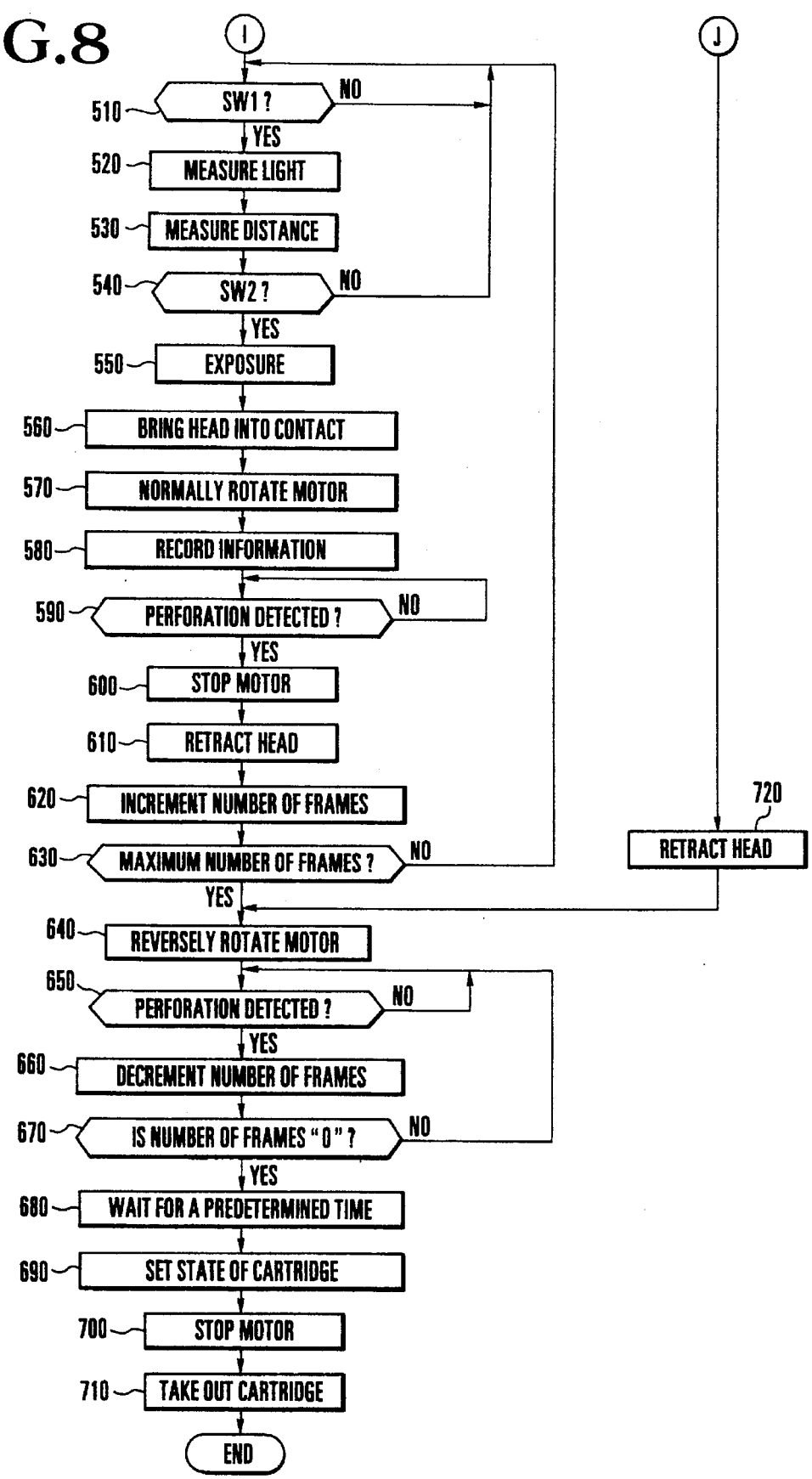
FIG. 8 is a flow chart showing the operation continuing from what is shown in FIG. 7.

FIGS. 6 to 8 are flow charts showing the flow of operation of a camera arranged according to the invention as a second embodiments thereof. The circuit arrangement of the camera is similar to that of the first embodiment and is, therefore, omitted from description. In FIGS. 6 to 8, the same step numbers as those used for the first embodiment are assigned to all parts of the flow of operation that are the same as those of the first embodiment. The following description is limited to such parts of the operation that differ from the flow of operation of the first embodiment.

If the frame being checked is decided to be an exposed frame at the step 390 of FIG. 7, as shown in FIG. 16(*c*), or to be an unexposed frame at the step 440, as shown in FIG. 17(*c*), the flow proceeds to a step 391. At the step 391, film transportation in the film rewinding direction is brought to a stop by stopping the film transport motor 59 from driving. At a next step 392, the magnetic head 8 is retracted from the film surface as the magnetic reproduction is not required. At a step 393, the display circuit 65 is caused to flicker to give a warning. The flow then comes to a step 510 of FIG. 8.

The second embodiment is arranged, as described above, to retract the magnetic head 8 from the film surface and make a warning display in the event of a discrepancy between the decisions made both when the film is transported in the winding direction and when the film is transported in the rewinding direction. The arrangement enables the user of the camera to readily know an abnormality of the camera.

Figure 9:
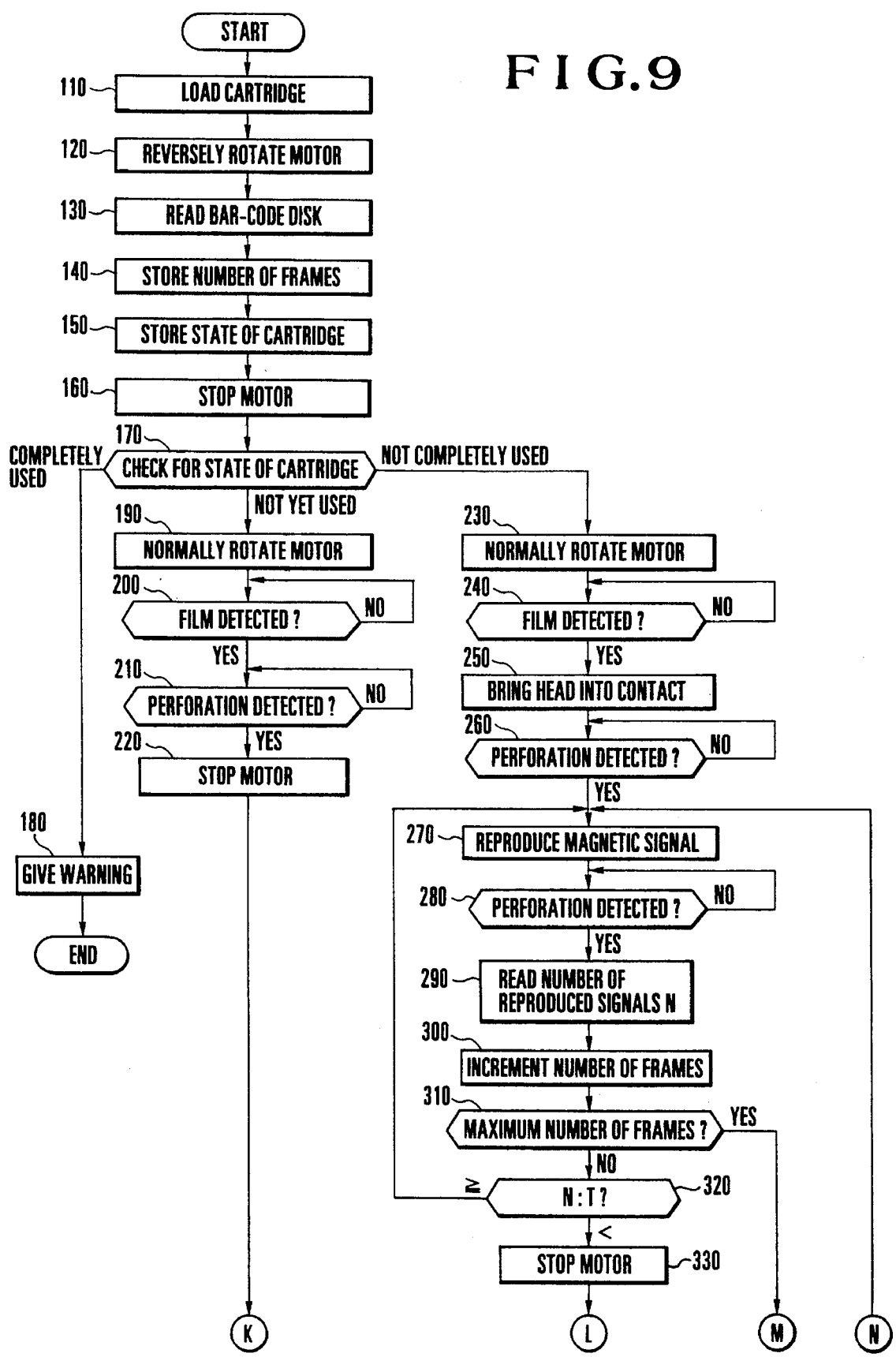
FIG. 9 is a flow chart showing a part of an operation of a camera which is arranged as a third embodiment of the invention.
Figure 11:
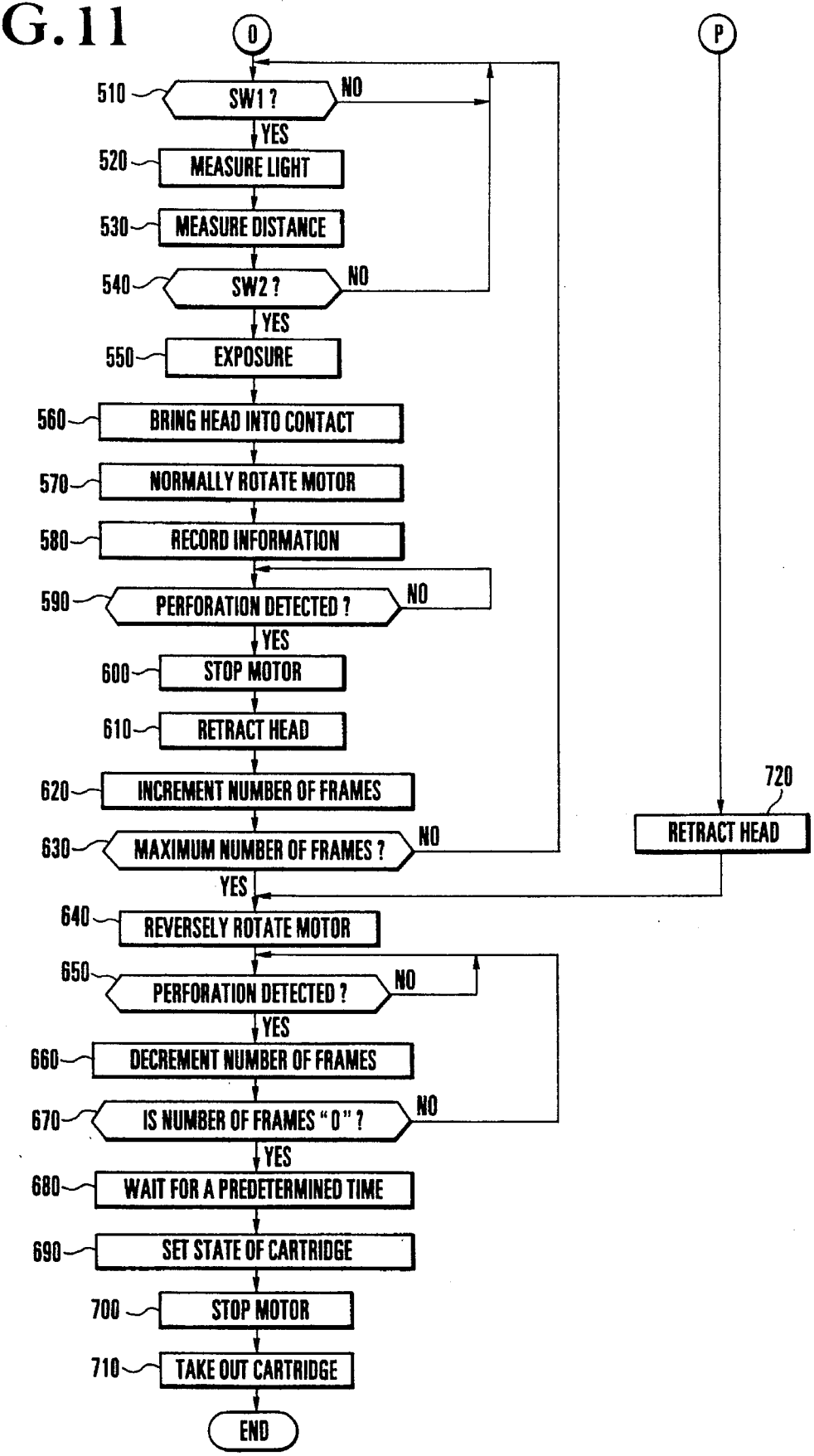
FIG. 11 is a flow chart showing the operation continuing from what is shown in FIG. 10.

FIGS. 9 to 11 are flow charts showing the flow of operation of a camera which is arranged according to the invention as a third embodiment thereof. The circuit arrangement of the camera is the same as that of the first embodiment and is, therefore, omitted from description. Further, the same step numbers as those used for the first embodiment are assigned to all parts of the flow of operation that are the same as those of the first embodiment. The description given below is limited to such parts that differ from the flow of operation of the first embodiment.

Referring to FIG. 10, if the frame being checked is decided to be an exposed frame at the step 390, as shown in FIG. 16(d), or to be an unexposed frame at the step 440, as shown in FIG. 17(d), the flow comes to a step 441 to bring a film transporting action in the film rewinding direction to a stop by stopping the film transport motor 59. At a next step 442, the film transport motor 59 is caused to normally rotate to begin transporting the film in the film winding direction. At a step 443, the flow waits for detection of a perforation by the photoreflector 7. When a perforation is detected, the flow proceeds to a step 445 to increment the count number of frames by one. After that, the flow comes back to the step 270 of FIG. 9.

The third embodiment is arranged, as described above, to handle the frame in process as an exposed frame and to continue the process of detecting unexposed frames in the event of a discrepancy between decisions made when the film is transported both in the film winding direction and in the film rewinding direction. The arrangement has an advantage in that the shooting operation can be allowed to continue in a case where the magnetic head 8 happens to come momentarily away from the film surface by accident.

Figure 12:
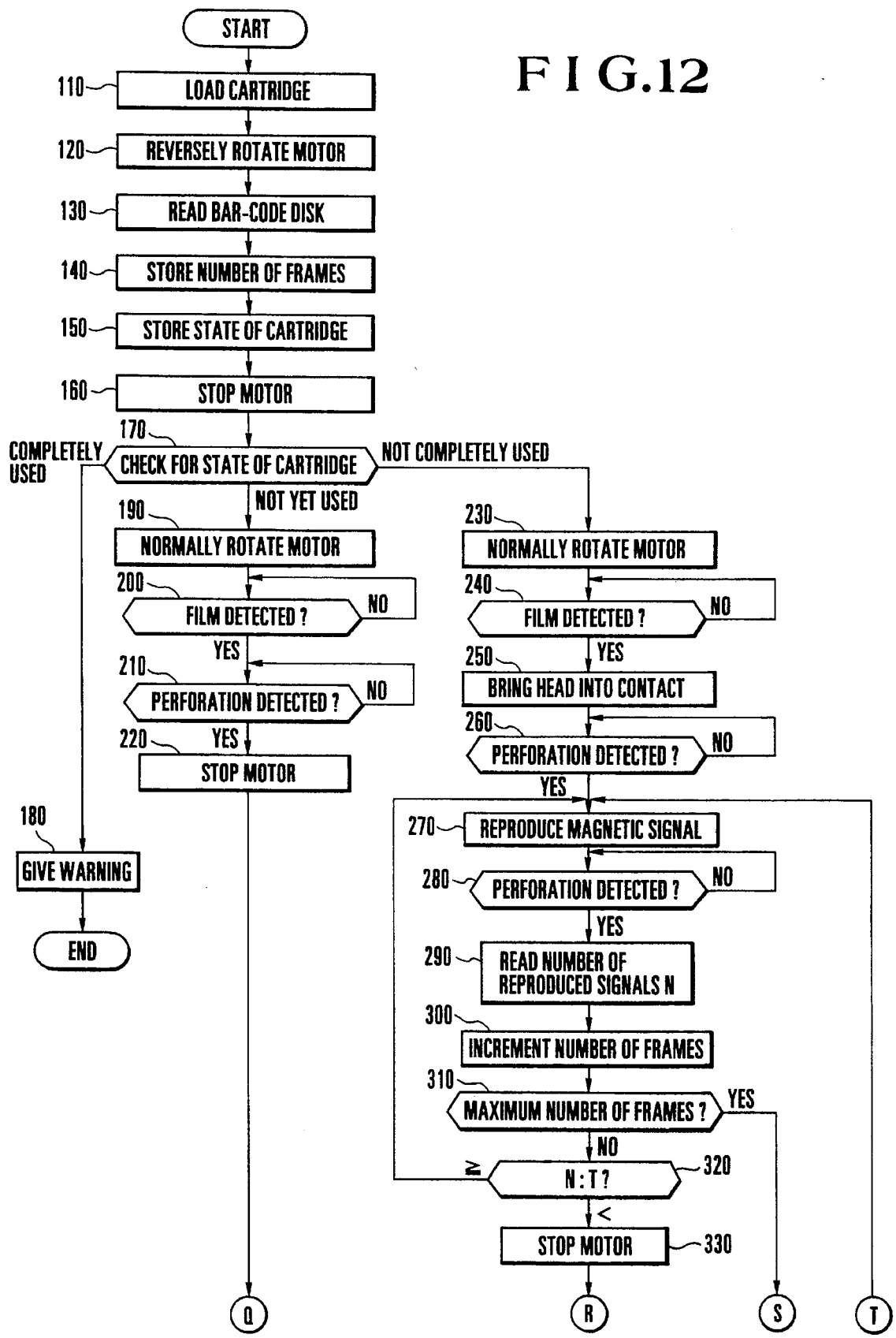
FIG. 12 is a flow chart showing a part of an operation of a camera which is arranged as a fourth embodiment of the invention.
Figure 13:
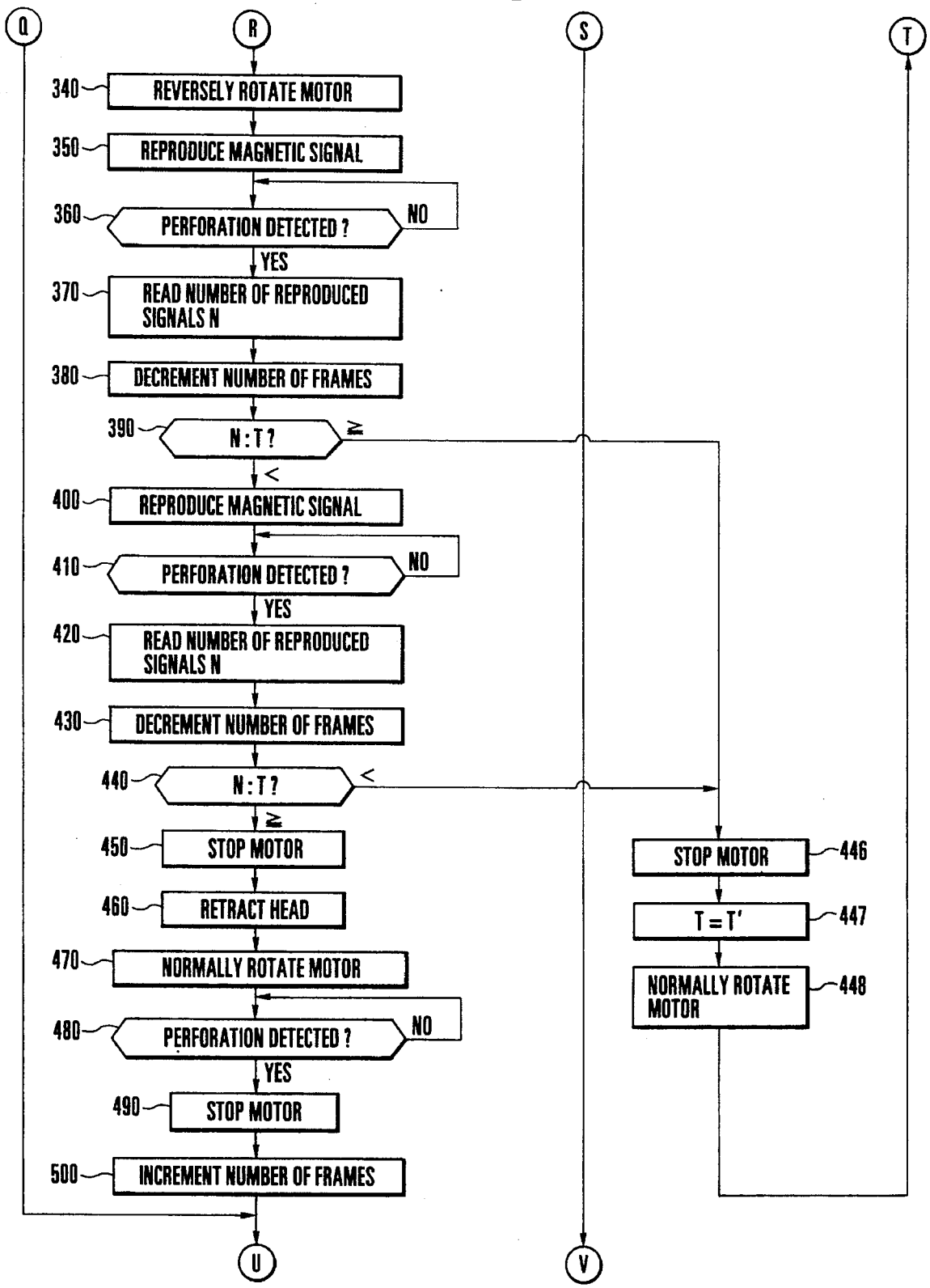
FIG. 13 is a flow chart showing the operation continuing from what is shown in FIG. 12.
Figure 14:
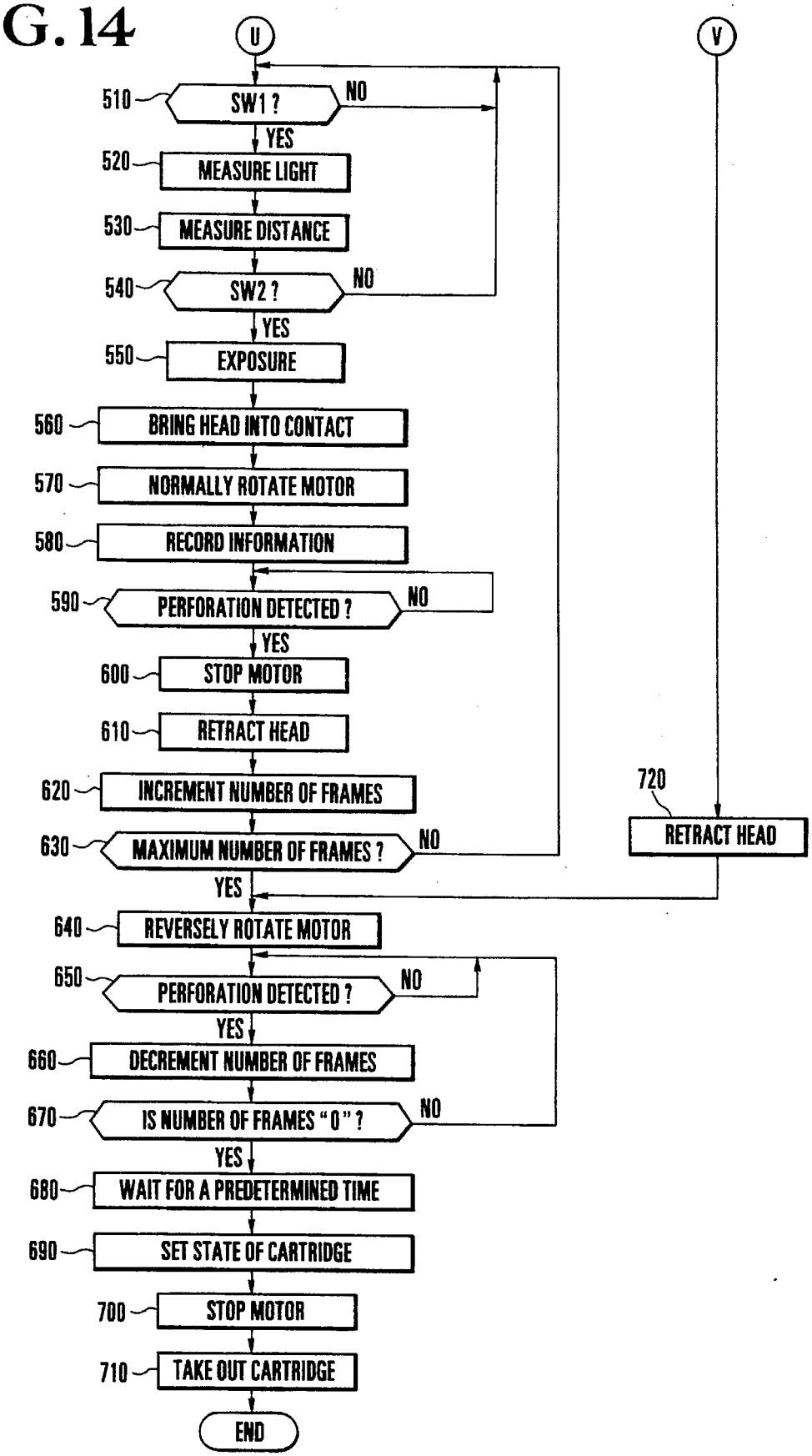
FIG. 14 is a flow chart showing the operation continuing from what is shown in FIG. 13.

FIGS. 12 to 14 are flow charts showing the flow of operation of a camera arranged as a fourth embodiment of the invention. The circuit arrangement of the camera is similar to that of the first embodiment and, therefore, is omitted from description. In the flow of operation shown in FIGS. 12 to 14, all parts that are the same as those of the first embodiment have the same step numbers as those of the first embodiment assigned to them, and the following description is limited to other parts which differ from the flow of operation of the first embodiment.

Referring to FIG. 13, if the frame being checked is decided to be an exposed frame at the step 390, as shown in FIG. 16(e), or to be an unexposed frame at the step 440 as shown in FIG. 17(e), the flow of operation comes to a step 446 to bring the action of transporting the film in the film rewinding direction to a stop by stopping the film transport motor 59 from driving. At a next step 447, the reference level T to be used for deciding the number of reproduced signals is changed to T'. At a step 448, film transportation in the film winding direction is caused to begin by causing the film transport motor 59 to normally rotate. The flow of operation then comes back to the step 270 of FIG. 12.

The fourth embodiment is arranged, as described above, to change a decision making level (to a higher level) and make a check again in the event of a discrepancy between decisions made when the film is transported both in the film winding direction and in the film rewinding direction. By virtue of this arrangement, a correct decision can be made to allow a shooting operation to continue in a case where an erroneous decision has been made in the neighborhood of the reference level.

FIGS. 15(a) and 15(b) to FIGS. 17(a) to 17(e) show the film transporting actions of the first to fourth embodiments described in the foregoing.

Figure 15A:
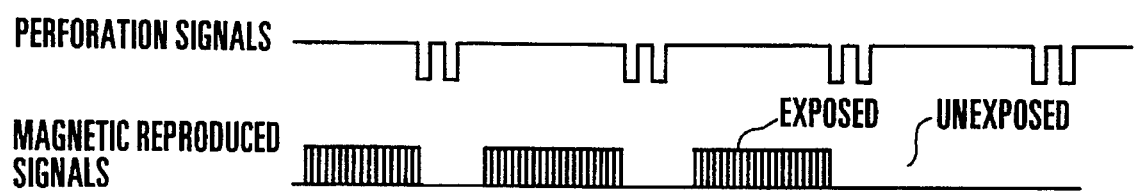
FIGS. 15(a) and 15(b) show in a time chart an operation of each of the embodiments of the invention performed in locating the leader part of an ordinary unexposed frame obtained in a normal state in a case where a film cartridge taken out before all the frames of the film are used is to be used again.
Figure 15B:
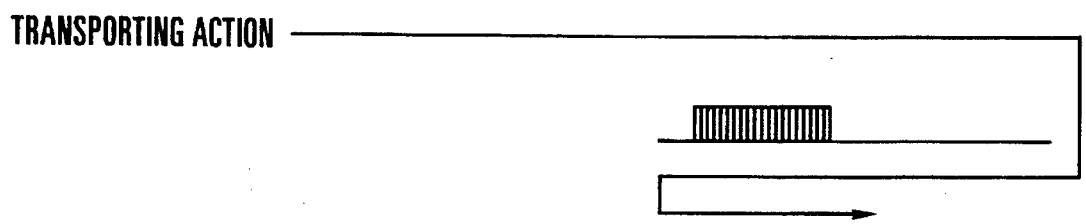

Of these drawings, FIGS. 15(a) and 15(b) show a process of locating and bringing the leading part of an unexposed frame in a case where a film cartridge which has been taken out (unloaded) before it is fully used and is in a normal state is to be used again.

A film winding action is first performed. A check is made to find if each of the frames has already been exposed by finding if any magnetic signal is recorded at the frame located among perforations. In making the check, the possibility of having some spurious reproduced signal generated by a noise or the like of a reproducing circuit at a frame for which no information has been recorded is taken into consideration. In a case where information is recorded in 300 bits or thereabout, for example, any frame that has a record of 150 bits (one half of 300 bits) and above is decided to be an exposed frame, while a frame having a record of less than 150 bits is decided to be an unexposed frame. A deciding (reference) level is thus set in the form of a number of bits.

When a frame which has not been exposed as yet (an unexposed frame) is detected while winding the film continuously, the film winding action comes to a stop at the unexposed frame. After that, the film is transported in the film rewinding direction to confirm unexposed and exposed frames. After confirmation, the film is wound up by one frame and is brought to a stop at a leading part of the unexposed frame.

FIGS. 16(a) to 16(e) show a case where a film cartridge which has been taken out before it is fully used is to be used again and is found to be in an abnormal state. Referring to these figures, when an unexposed frame is detected while winding the film, the film winding action is brought to a stop there. (In this case, it is assumed that the unexposed frame thus detected has actually been exposed but is erroneously detected as an unexposed frame due to a noncontact state momentarily occurring between the magnetic head 8 and the film surface.) After that, the film is transported in the film rewinding direction. Then, if the frame in question is decided to be an exposed frame, contrary to the decision made at the time of film winding, an action is taken in the following manner. In the case of the first embodiment, as shown in FIG. 16(b), the film is rewound. In the second embodiment, the film is stopped at the frame where the discrepancy is detected and a warning is given, as shown in FIG. 16(c). In the third embodiment, the discrepant frame is regarded as an exposed frame and the process of detecting unexposed frames is carried on, as shown in FIG. 16(d). In the fourth embodiment, the frame in question is reexamined by changing the reference level which is used for a discrimination between exposed and unexposed frames, as shown in FIG. 16(e).

FIGS. 17(a) to 17(e) show another case where a film cartridge which has been taken out before it is fully used and is in an abnormal state is to be used again. Referring to these figures, when an unexposed frame is detected while winding the film, the film winding is stopped there. (The unexposed frame is, in this case, assumed to be actually an exposed frame but mistaken for an unexposed frame due to a fault of the reproducing circuit.) After that, the film is transported in the film rewinding direction to confirm the unexposed frame and, then, the exposed frame. If the frame is then confirmed as an unexposed frame, contrary to the decision made at the time of film winding, the following action is taken. In the case of the first embodiment, the film is rewound, as shown in FIG. 17(b). In the second embodiment, the film is stopped at the frame for which the discrepancy is detected and a warning is given, as shown in FIG. 17(c). In the third embodiment, the frame for which the discrepancy is detected is considered to be an exposed frame and the unexposed frame detecting process is continued, as shown in FIG. 17(d). In the fourth embodiment, the frame is reexamined by changing the reference level used for a discrimination between exposed and unexposed frames, as shown in FIG. 17(e).

The invention applies to any apparatus that is capable of recording data by any of different methods, including an optical recording method, etc.

The embodiments described are arranged to control film transportation by detecting the perforations of the film with the photoreflector. However, the invention is not limited to this method. In accordance with the invention, this detecting method may be replaced with any other suitable method. Further, in accordance with the invention, the pulse signal which is used as a film movement indicating signal may be replaced with any other suitable signal.

While the invention has been described by way of example as applied to a single-lens reflex camera, a lens-shutter type camera, a video camera, etc., the invention is also applicable to other optical apparatus, apparatuses other than optical apparatus and to some component units of such apparatuses.

Further, the invention applies to any suitable combinations of the embodiments or their technological arrangements described in the foregoing.

What is claimed is:

1. A camera arranged to detect, with sensing means, magnetic information recorded in a magnetic recording part provided at each frame of a film and to make a discrimination between exposed and unexposed frames, comprising:
   a) film transporting means; and
   b) rechecking means for causing, when a frame is decided to be an unexposed frame according to a result of detection of the magnetic information by said sensing means from the magnetic recording part of each frame while the film is transported by said film transport means in a first direction, said sensing means to detect again the magnetic information from the magnetic recording part of the same frame while the film is transported by said film transport means in a second direction which differs from the first direction.

2. A camera according to claim 1, further comprising first decision means for determining a state of exposure of the frame according to whether or not a result of detection made by said rechecking means through said sensing means while the film is transported in the second direction coincides with the result of detection made by said sensing means while the film is transported in the first direction.

3. A camera according to claim 2, further comprising second decision means for causing, when the results of detection made when the film is transported both in the first and second directions are determined to coincide with each other through said first decision means, said sensing means to detect the magnetic information on the recording part on an immediately preceding frame and for determining a state of exposure of the immediately preceding frame.

4. A camera according to claim 2, further comprising restraining means for restraining a shooting action when said first decision means determines the results of detection not to coincide with each other.

5. A camera according to claim 3, further comprising restraining means for restraining a shooting action when said second decision means determines the results of detection as an unexposed state.

6. A camera according to claim 2, further comprising warning means for giving a warning when said first decision means determines the results of detection not to coincide with each other.

7. A camera according to claim 3, further comprising warning means for giving a warning when said second decision means determines the results of detection as an unexposed state.

8. A camera according to claim 2, further comprising control means for processing, when said first decision means determines the results of detection not to coincide with each other, the frame as an exposed frame and, after that, causing said sensing means to resume a detecting action thereof while the film is transported in the first direction.

9. A camera according to claim 3, further comprising control means for causing, when said second decision means determines the results of detection as an unexposed frame, said sensing means to resume a detecting action thereof while the film is transported in the first direction.

10. A camera according to claim 2, further comprising control means for changing, when said first decision means determines the results of detection not to coincide with each other, a determination level used for a detecting action of said sensing means on the frame determined by said first decision means.

11. A camera according to claim 3, further comprising control means for changing, when said second decision means determines the results of detection as an unexposed state, a determination level used for a detecting action of said sensing means.

12. A camera arranged to detect, with sensing means, magnetic information recorded in a magnetic recording part provided at each frame of a film and to make a discrimination between exposed and unexposed frames, comprising:
   a) film transporting means;
   b) control means for causing said sensing means to perform a detecting action on the magnetic information recorded on the magnetic recording part of a frame when the film is transported by said film transporting means in a first direction
   and, when said frame is determined to be unexposed on the basis of information detected through said detecting action at the time of transport of the film in the first direction, to transport with said transporting means the film in a direction opposite to the first direction, and to re-detect thereby magnetic information recorded on the magnetic recording part of the frame; and
   c) a processing circuit for making a discrimination according to whether or not a coincidence is found in results of detection made when the film is transported both in the first and second directions, and for varying a processing action in accordance with a result of the discrimination.

13. A camera arranged to detect, with sensing means, magnetic information recorded on a magnetic recording part provided at each frame of a film and to make a discrimination between frames at a first film state and a second film state, comprising:
   a) film transporting means; and
   b) rechecking means for causing, when a frame is determined to be a frame at said first film state according to a result of detection of the magnetic information by said sensing means on the magnetic recording part of each frame while the film is transported by said film transport means, said sensing means to re-detect the magnetic information on the magnetic recording part of said frame as said first film state.

14. A camera according to claim 13, wherein said first film state stands for an unexposed film state and said second film state stands for an exposed film state.

* * * * *